United States Patent
Pai

[11] Patent Number: 6,012,819
[45] Date of Patent: Jan. 11, 2000

[54] SAFE REFLECTIVE MIRROR WITH ENLARGED VISUAL FIELD

[76] Inventor: Chun-Teng Pai, No.41, TuGou Tsun, Hou Bi Hsiang, Tainan Hsien, Taiwan

[21] Appl. No.: 09/357,715

[22] Filed: Jul. 20, 1999

[51] Int. Cl.[7] ................................. G02B 5/08; B60R 1/10
[52] U.S. Cl. ......................... 359/855; 359/856; 359/857; 359/862; 359/865; 248/479; 248/486
[58] Field of Search ...................................... 359/850, 855, 359/856, 857, 858, 861, 862, 863, 864, 865, 872, 875; 248/479, 481, 486

[56] References Cited

U.S. PATENT DOCUMENTS

| | | | |
|---|---|---|---|
| 1,719,342 | 7/1929 | Rodgers | 359/862 |
| 1,748,837 | 2/1930 | Greensfelder | 359/863 |
| 1,768,191 | 6/1930 | Crook | 359/863 |
| 2,674,921 | 4/1954 | Williams | 359/862 |
| 5,280,391 | 1/1994 | Peinovich | 359/862 |
| 5,644,443 | 7/1997 | Hung | 359/865 |

FOREIGN PATENT DOCUMENTS

| | | | |
|---|---|---|---|
| 608849 | 8/1926 | France | 359/862 |
| 2824354 | 12/1978 | Germany | 359/858 |
| 1127233 | 9/1968 | United Kingdom | 359/862 |
| 2088799 | 6/1982 | United Kingdom | 359/862 |

*Primary Examiner*—Ricky D. Shafer
*Attorney, Agent, or Firm*—Pro-Techtor International Services

[57] ABSTRACT

The present invention discloses a safe reflective mirror with enlarged visual field, which comprises a case, two reflective mirrors and a fixing base. The case is installed to the other side of the driver within the vehicle by the fixing base. There is a viewing window pointing toward the front of the vehicle on the front end of the case and a display window, opposite to the viewing window, that is on the other side of the case and always pointing toward the driver. There are rotation axes located at positions extended from the viewing window and display window inside the case. The backs of the reflective mirrors are equipped with control rods, with which the two mirrors are mounted on the two rotation axes. The rods extend outside the case for adjusting the viewing angles of the mirrors to allow the drive obtain a wider visual field and thus driving safety.

6 Claims, 6 Drawing Sheets

SAFE REFLECTIVE MIRROR WITH ENLARGED VISUAL FIELD

BACKGROUND OF THE INVENTION

1. Field of the Invention

The invention relates to a safe reflective mirror with enlarged visual field and, in particular, to a safe reflective mirror that makes use of the reflective principle of the mirror to provide the user with a larger viewable area so as to ensure the safety and to improve the quality in driving or daily life.

2. Description of the Prior Art

As the society gets highly developed, the use of vehicles also becomes more often. Relative to the great progress in car industry, however, the accompanying damage such as air pollution, noise or traffic accidents also prevails. Among all, the traffic accidents cause the most direct and obvious threat to lives. Reading daily news, one will find a lot of serious traffic accidents that take away people's life and make many broken families.

When analyzing the real cause of the accidents, other than the carelessness of the driver, the intrinsic defect of the vehicle body structure can not be neglected. When the vehicle is in motion, the direction and distance must be judged by the driver. Nevertheless, the human visual angle has its limitation in nature and the driving seat is on one side of the car, therefore the front space of the other side will have a blind spot to the driver. Suppose there is a sudden incident right on the blind spot, even an observant driver could still run into trouble. If the driver is hesitant for a while, then a tragedy may happen.

To prevent the above-mentioned events, there are already several resolutions, such as the U.S. Pat. No. 5,644,443 "Reflective Dead Angle Vision Device for Vehicle Side Mirrors". This invention makes use of two reflective mirrors 2, 2', installed by a hook 19 on the rearward viewing mirror, to provide the driver with a wider visual field by showing the traffic in front of the vehicle. Nonetheless, this patent still contains the following drawbacks to be improved:

1. The visual angle of the mirror is fixed and hard to adjust, thus it must be exclusively designed for specific car types and drivers. This not only increases the cost but the finction of the device can not fully appreciated.

2. The reflective mirror must be attached to the rearview mirror, while there might be a situation where they are not so compatible that the visual angle is limited.

3. Installed onto the rearview mirror only with a hook, the device may suffer from the risk of falling due to the unavoidable vibrations from the vehicle in motion.

4. The forward viewing mirror, for observing the front view, and the rearward viewing mirror, for the rear view, are combined together side by side. This could make the driver confused and thus cause danger.

Also, please refer to the U.S. Pat. No. 4,685,779 "Combined Forward and Rearward Viewing Mirror Assembly for Automotive Vehicles". This patent uses a connecting device 209 to combine two mirror sets 201, 203, wherein the mirror set 203 is a device with two reflective mirrors. When the extensible connecting device 209 is properly adjusted, the user's eyes 204 can directly observe the rear traffic when sitting behind the mirror set 203 and, at the same time, the front traffic from the mirror set 201 by reflecting the view in front of the mirror set 203. Thus, the device completes the function of observing both the front and rear views simultaneously. Analogous to the previous U.S. Pat. No. 5,644,443, this invention combines a forward viewing mirror with a rearward viewing mirror. Therefore, the forward and rearward visual angles are not easy to adjust, and watching both forward and rearward views will cause confusion. Furthermore, the structure of this patent is complicated, expensive in cost, and may destroy the structure of the original rearview mirror of the car.

Accordingly, the above mentioned objects of the prior art are not good designs and need to be improved. In observation of their drawbacks, the inventor of the present invention tried hard to ameliorate the device and finally succeeded in presenting the safe reflective mirror with enlarged visual field of the instant invention after many years of research and hard-working.

SUMMARY OF THE INVENTION

The invention provides a safe reflective mirror with enlarged visual field, wherein the device has an individual case that can be installed anywhere suitable for observing inside the vehicle, without modifying any structure of the body of the vehicle.

Furthermore, the present invention provides a safe reflective mirror with enlarged visual field, whose case can be adjusted freely about the installation position. Thus it is applicable to any vehicle and driver.

Moreover, the invention provides a safe reflective mirror with enlarged visual field, whose product specifics can be singularized to facilitate the industrial development and to minimize the cost.

Yet, the instant invention provides a safe reflective mirror with enlarged visual field, which provides a device for pure observation of the front traffic and helps ensuring driving safety.

Also, the invention provides a safe reflective mirror with enlarged visual field, whose individual body can be installed around the comer of the road or house, or near the door to make life more convenient.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
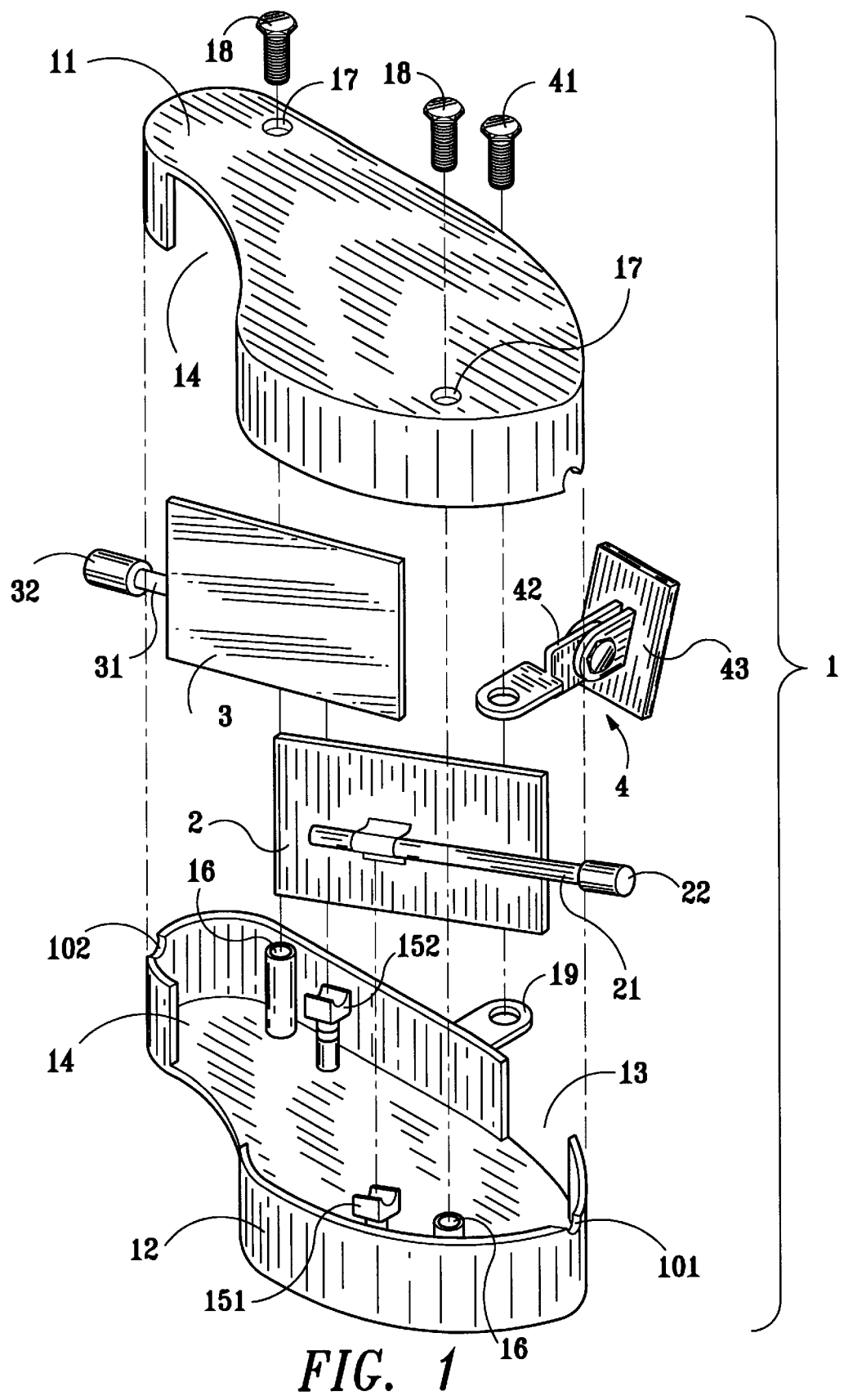
FIG. 1 is a three dimensional top perspective of the safe reflective mirror with enlarged visual field according to the present invention.
Figure 2:
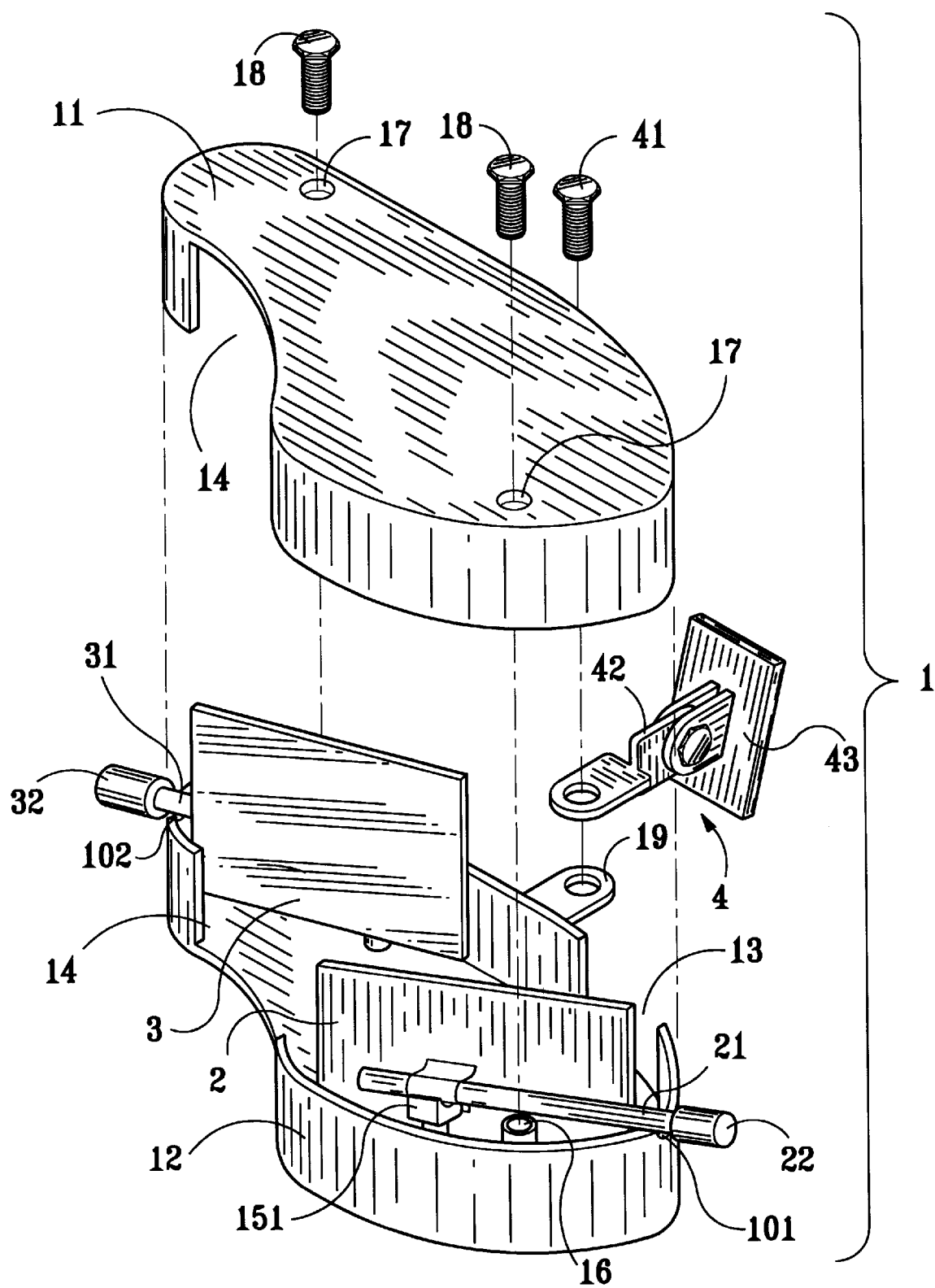
FIG. 2 is an installation embodiment of the safe reflective mirror with enlarged visual field according to the present invention.
Figure 3:
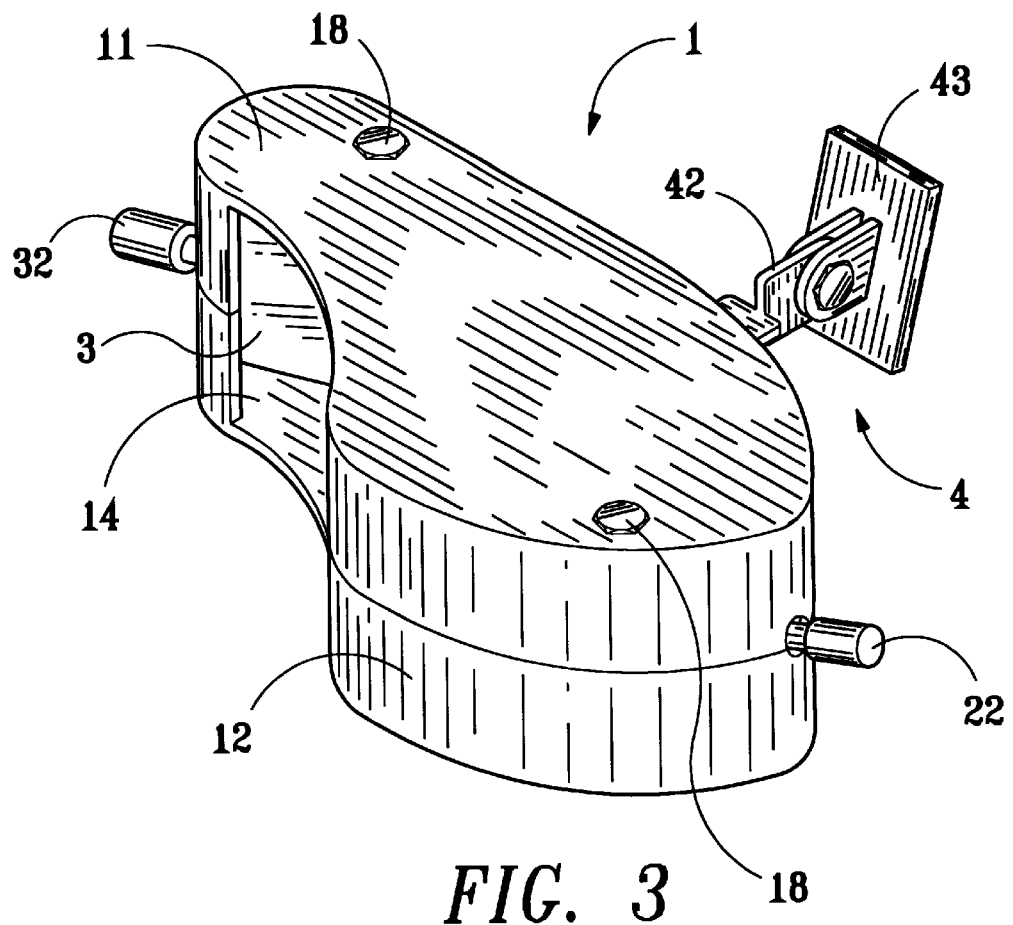
FIG. 3 is a three dimensional combinatory description of the safe reflective mirror with enlarged visual field according to the present invention.

Please refer to FIG. 1 through FIG. 4. The safe reflective mirror with enlarged visual field according to the present invention comprises: a case 1, two reflective mirrors 2, 3, and a fixing base 4. The case 1 essentially consists of an upper cover 11 and a lower cover 12 and is installed on the opposite side to the driver seat within the vehicle. On one side of the front end of the case 1, there is a viewing window 13 toward forward direction; while one the other side of the rear end of the case 1, there is a display window 14 toward the driver, so that the viewing window 13 and display window 14 are in opposite positions. There are rotation axes 151, 152 positioned on the lower cover 12 underneath the viewing window 13 and the display window 14, respectively, to support the two reflective mirrors 2, 3. Further, there is a support 19 by the viewing window 13 and between the upper cover 11 and the lower cover 12 to connect with the fixing base 4.

Figure 5:
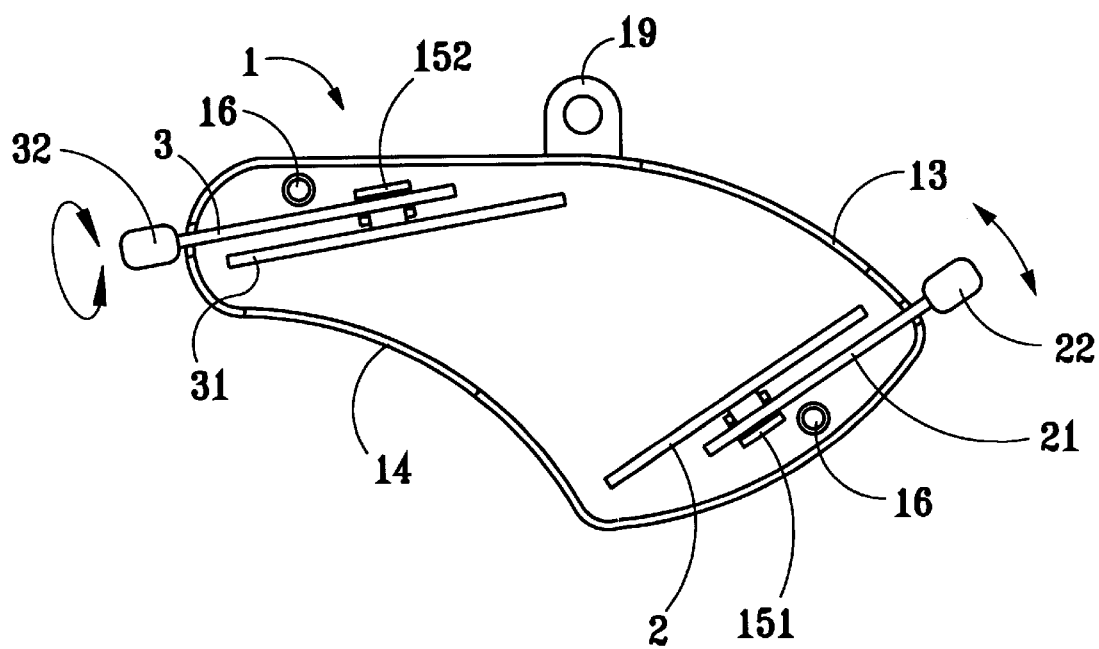
FIG. 5 is a diagram showing the adjustment of the safe reflective mirror with enlarged visual field according to the present invention.

Please refer to FIG. 5. There are two control rods 21, 31 on the back of the reflective mirrors 2, 3, respectively. The two reflective mirrors 2, 3 are fixed onto the two rotation axes 151, 152, respectively, with the help of the two control rods 21, 31. One end of each of the control rods 21, 31 is extended through the apertures 101, 102 on the case 1, respectively, to the outside of the case 1; and each of the extended ends locates a knob 22, 32, respectively, for the user to hold and adjust the elevation, depression, left, and right viewing angles.

Furthermore, on the back of the reflective mirrors 2, 3 within the lower cover 12, there are two connecting pillars 16, respectively; while there are connecting holes 17 on the upper cover 11 corresponding to the connecting pillars 16, respectively, so that the upper cover 11 and the lower cover 12 can be connected with screws 18 driven through the connecting holes 17 to the connecting pillars 16.

Figure 7:
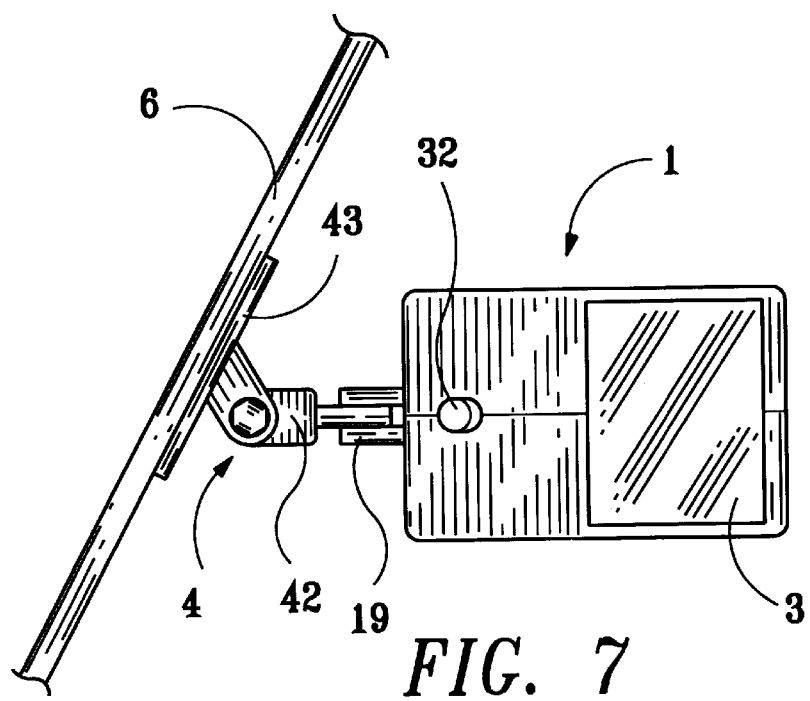
FIG. 7 is a diagram describing how to fix the safe reflective mirror with enlarged visual field according to the present invention.
Figure 4:
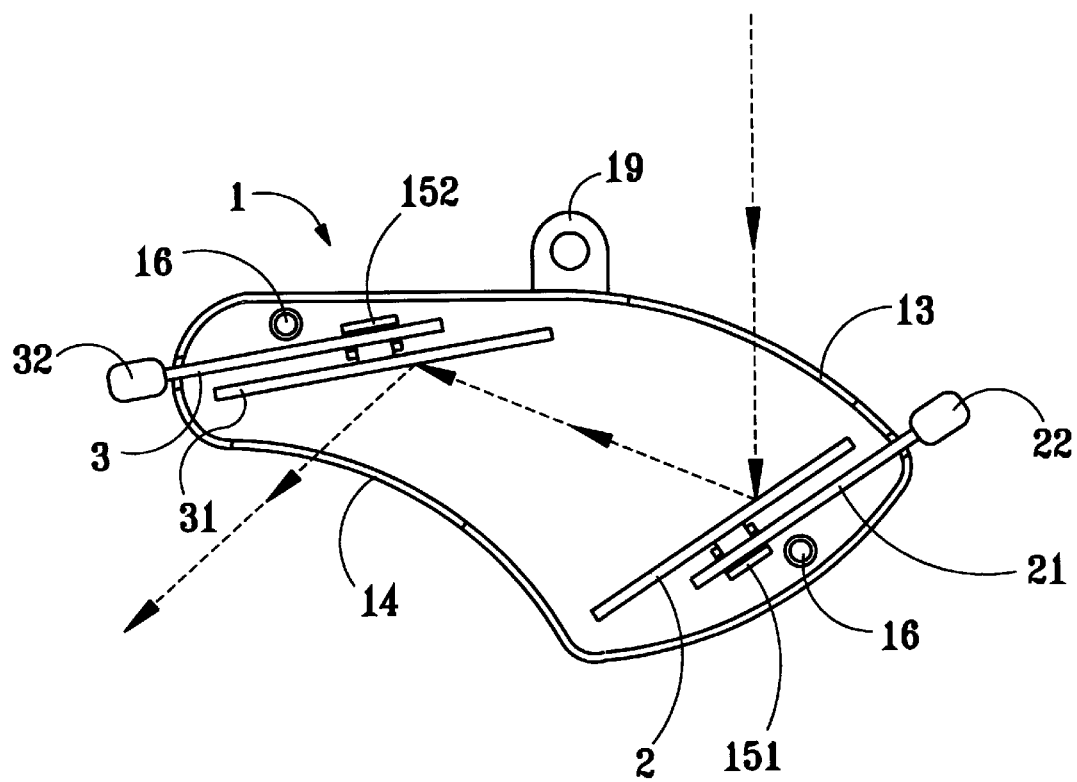
FIG. 4 is a diagram explaining the embodiment principle of the safe reflective mirror with enlarged visual field according to the present invention.
Figure 6:
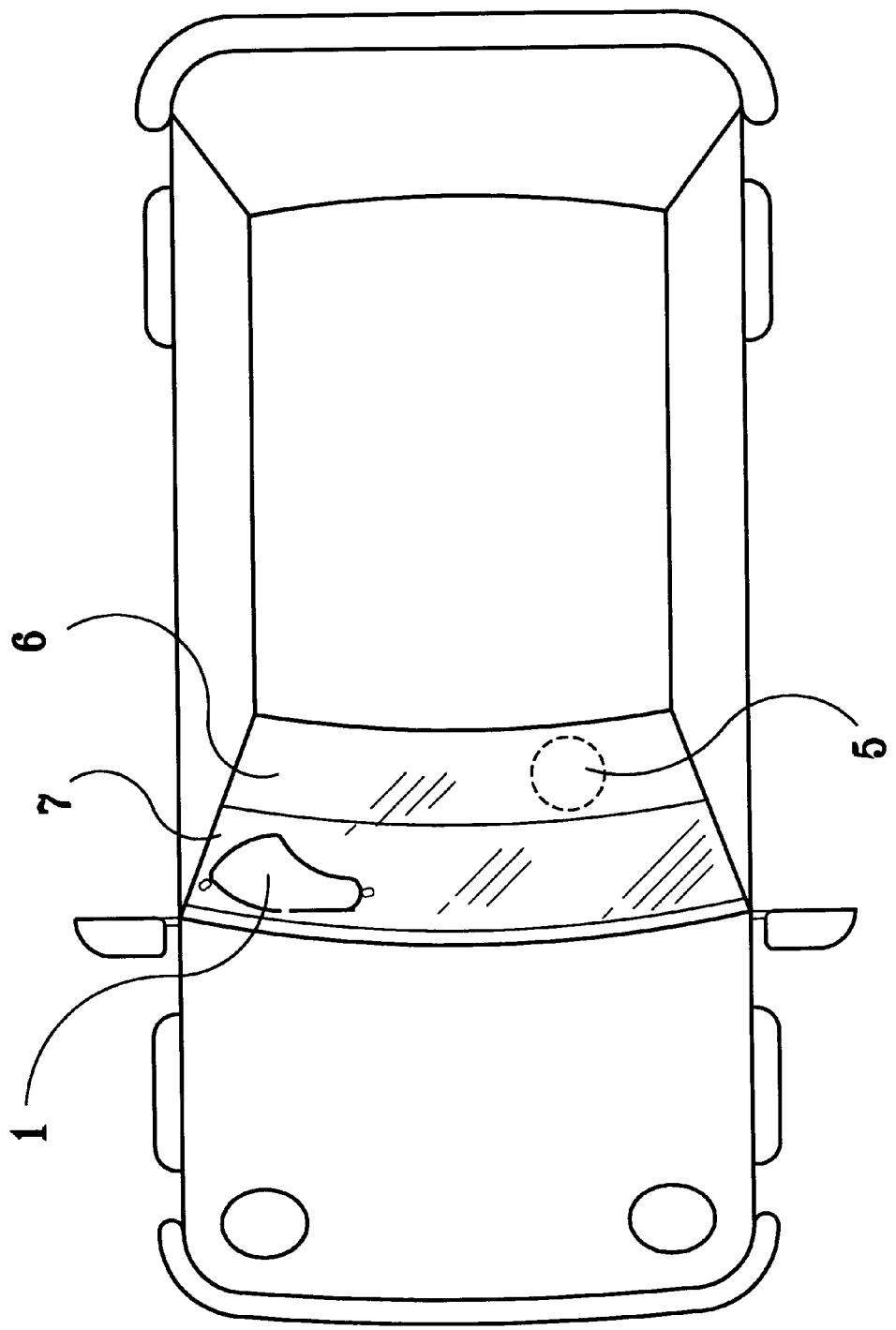
FIG. 6 is an embodiment of the safe reflective mirror with enlarged visual field according to the present invention.

Please refer to FIG. 6 and FIG. 7 simultaneously. The fixing base 4 is used to fix the position of the case 1. The front end of the base 4 has a cardan joint 42 which is fixed to the support 19 with a screw 41 and can rotate freely to any direction. On the back end of the cardan joint 42 sits a fixing plate 43, which enables the fixation of the case 1 to the windshield 6 or to the plate 7 under the windshield 6 by glue or screws. Properly adjusting the angle of the cardan joint 42 can make the display window 14 on case 1 toward the direction of the driver 5 all the time.

Figure 8:
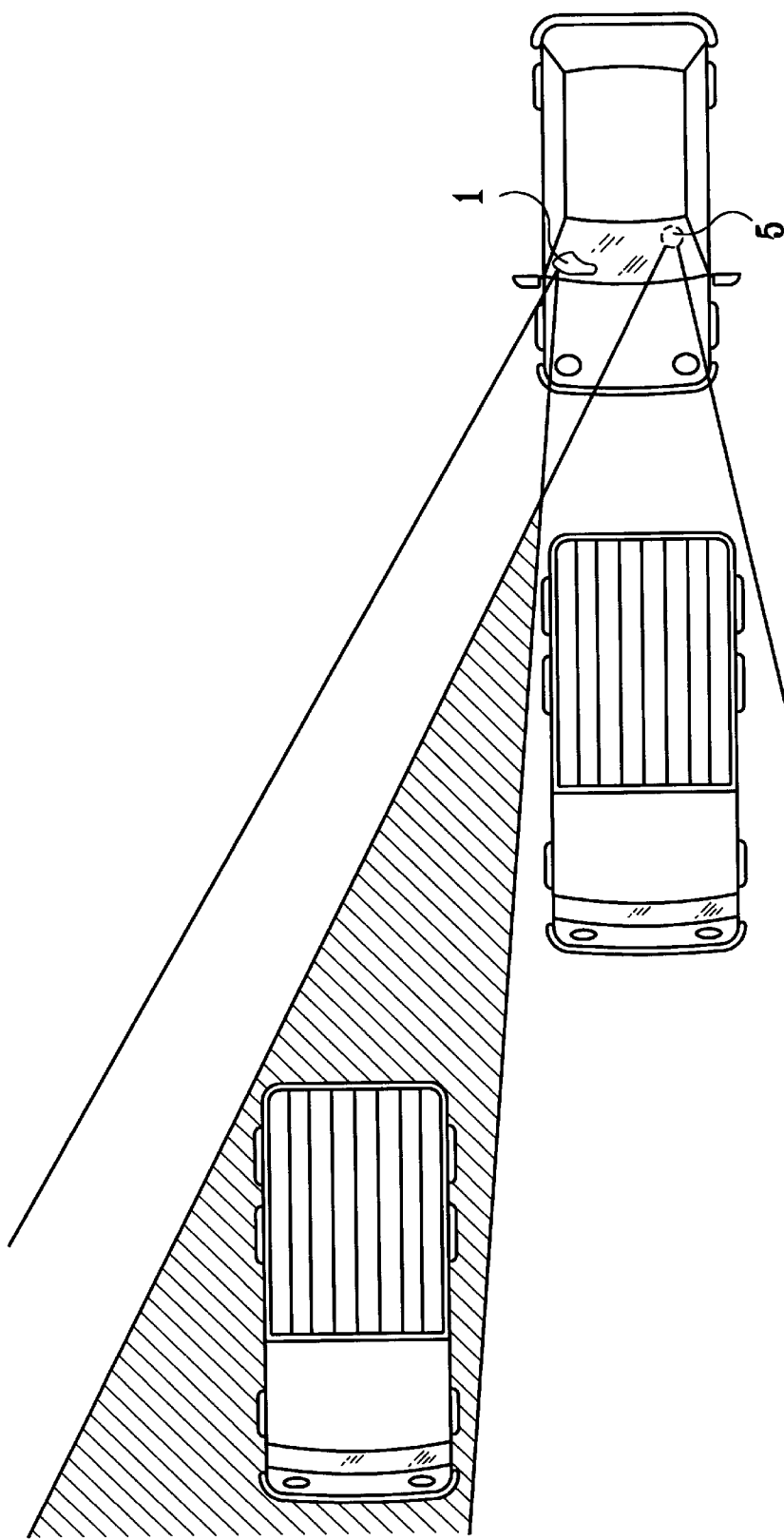
FIG. 8 shows the benefits gained from the function of the safe reflective mirror with enlarged visual field according to the present invention.

Please refer to FIG. 8. With the help of the two reflective mirrors 2, 3, the invisible area or the view at the dead angle to the driver 5 can be projected into the eyes of the driver 5 via the viewing window 13, reflective mirrors 2, 3 and the display window 14. Therefore the driver obtains a wider visual field to eliminate the perilous dead angles and thus enjoys a safer driving.

The two reflective mirrors can be adjusted by the knobs 22, 32 to take a proper visual field according to different sizes of vehicles and builds of drivers. So this invention can be applied to any type of vehicle and driver.

In the above description, the two rotation axes 151, 152 are not limited to be located on the upper cover 11 or the lower cover 12, as long as they possess the function of adjusting the angles of the two reflective mirrors 2, 3. And the upper cover 11 and lower cover 12 can be connected by high frequency wave welding, gluing, clasping or other methods that can guarantee the firmness of the case 1. The cardan joint 42 can be located at any place on the case 1 other than the viewing window 13 and the display window 14. Yet, the invention can be applied to places other than the vehicle, such as the corner around the road or house. or near the door to provide the user with an enlarged visual field.

The safe reflective mirror with enlarged visual field according to the present inventio,n when compared with the previously quoted patents and other prior art, have the following merits:

I. Cost-effective: this invention has a unified product specifics, can be put into mass production, and does not destroy any part or device of the car; therefore, it is cost effective.

II. Good applicability: this invention can be applied to any type of car and driver; thus its function can be fully appreciated.

III. High safety: this invention provides a structure of a safe reflective mirror with enlarged visual field, which is the best safety guarantee to both the driver and the passengers.

IV. Wide application: this invention can be used not only on the vehicle structure, but also any place that need an enlarged visual field.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A safe reflective mirror with enlarged visual field comprising case; wherein on one side of a front end of said case locates a viewing window, pointing toward a target position, agd on the opposite side of a rear end of said case locates a display window, pointing toward a user; and a rotation axis is placed at a position extended from each of said viewing window and said display window inside said case, respectively;

two reflective mirrors, wherein on the back of each of said mirrors is equipped with a control rod which is located on said rotation axis corresponding to said viewing window and said display window, respectively, so that the reflective surfaces of said mirrors face each other and one end of each control rod is extended outside of said case;

a fixing base, wherein a front end of said base has a cardan joint connecting to one side of the surface of said case, and a rear part of said cardan joint is a fixing plate.

2. A safe reflective mirror with enlarged visual field as in claim 1, wherein said case consists of an upper cover and a lower cover.

3. A safe reflective mirror with enlarged visual field as in claim 2, wherein said upper cover and said lower cover are connected by methods consisting of screwing, high frequency wave welding, gluing and clasping.

4. A safe reflective mirror with enlarged visual field as in claim 1, wherein the ends of said two control rods that extend outside said case are attached with knobs.

5. A safe reflective mirror with enlarged visual field as in claim 1, wherein the elevation, depression and left-right viewing angles of said two reflective mirrors can be adjusted within said case via the rotation axes.

6. A safe reflective mirror with enlarged visual field as in claim 1, wherein said fixing plate fixes said case to a windshield or to a plate under a windshield on the other side of a driver within a vehicle by screws, glue or clasping.

* * * * *